Feb. 22, 1944.  J. W. HALE  2,342,540
COUPLING DEVICE
Filed Oct. 12, 1939

INVENTOR.
Jesse W. Hale
BY Spear Rawlings & Spear
ATTORNEYS.

Patented Feb. 22, 1944

2,342,540

UNITED STATES PATENT OFFICE 2,342,540

COUPLING DEVICE

Jesse W. Hale, Newton, Mass.

Application October 12, 1939, Serial No. 299,138

3 Claims. (Cl. 64—29)

My present invention relates to improvements in coupling devices to connect a drive member to a driven member where a maximum torque is allowable or where the connecting of the members is gradual and variable as the speed of such members is increased and is a continuation-in-part of Letters Patent No. 2,199,993, granted May 7, 1940, filed July 19, 1937.

While the use of such a device in automobiles affords the best illustration of its adaptability, there are many other instances where the rate of engagement of the drive and driven members may be well served with this device. For instance, electric motors which have low torque characteristics at low speeds may be equipped with this device to enable them to assume the load as the motor speed increases.

In accordance with my invention the members are coupled by compressible anti-friction units carried by radial bores in one of the members and engageable with the other of the members which is formed with a plurality of pockets. I employ means to vary the coupling influence of the compressible units that may be operated manually, by a governor, or by torque controlled means such as shown in Letters Patent 2,091,391, or such as an electric motor or solenoid in shunt with the output of a generator or the input to an electric motor.

By pre-loading the tension the device may be driven from either end. In the drawing I have shown illustrative embodiments of my invention and throughout the drawing and specification like reference numerals indicate corresponding parts.

Figure 1:
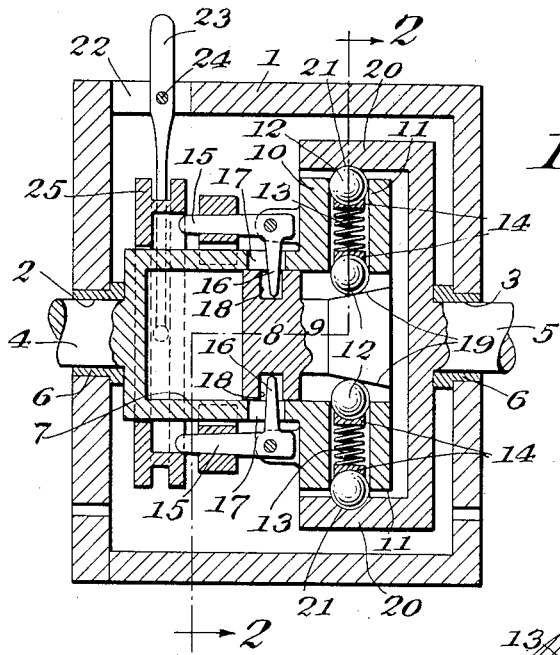
Fig. 1 is a partly sectioned view of my device.

A coupling device such as that shown in the accompanying drawing may include, in accordance with my invention, a housing 1 having axial ports 2 and 3 for the shafts 4 and 5. Suitable bushings indicated as at 6 are of course employed where necessary. The shaft 4 includes a hollow enlarged head 7 adapted to receive the flanged head 8 of the slidable actuating member 9. The head 7 is provided with a flanged end 10 having a plurality of radial bores 11 to receive ball bearings 12. The ball bearings 12 are under the influence of compression springs 13 from which they are separated by suitable antifriction devices 14 such as molded graphite or other such devices to permit frictionless rotation of the balls 10.

Governors 15 mounted on the flanged end 10 include arms 16 which extend through the slots 17 in the head 7 into an annular groove 18 in the head. Rearwardly of the flange 8 the member 9 is provided with a tapered shoulder 19.

The shaft 5 is provided with a hollow cylindrical head 20 overlying the flange 10. The inner surface of the cylinder 20 is provided, as is shown most clearly in Fig. 2, with a series of detent surfaces or pockets 21 into which the springs 13 force the ball bearings 12 to couple the shafts 3 and 5 together.

As indicative of one possible basis of control of my coupling, I have shown the casing 1 formed with an opening 22 to receive a lever 23 pivoted at 24 to the casing 1 in control of a recessed slide 25 slidable on the head 7 and effective to render the governors 15 inoperative when coupling of the drive members 4 and 5 or variation of the coupling effect is not desired.

Assuming the locking out mechanism just described to be disengaged so that the governor 15 may be actuated outwardly by centrifugal force, it will be seen that as the speed of the shaft 4 increases the flanged head 8 is moved axially carrying the tapered portion 19 to compress the spring 13 to increase the coupling effect between the shafts 4 and 5 and the cylinder 11.

Figure 2:
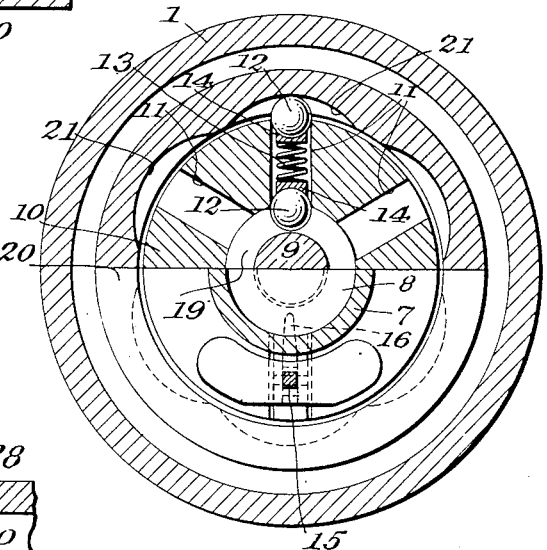
Fig. 2 is a section along the lines 2—2 of Fig. 1.

In the embodiment of my invention shown in Figs. 1 and 2, it will be noted that the coupling becomes effective as the speed of the shaft 4 increases to cause the springs to compress sufficiently to couple the members. As the speed of the shaft 4 decreases, the extent of spring compression is lessened until, because of the load on the member 11, the springs yield as the member 10 rotates. In this embodiment of my invention, the shaft 4 may be considered the drive shaft although it will be obvious that by loading the springs 13, either the shaft 4 or the shaft 5 may be the drive shaft so that the governor 15 may be uniform to either the speed of the drive shaft or the speed of the driven shaft.

Figure 3:
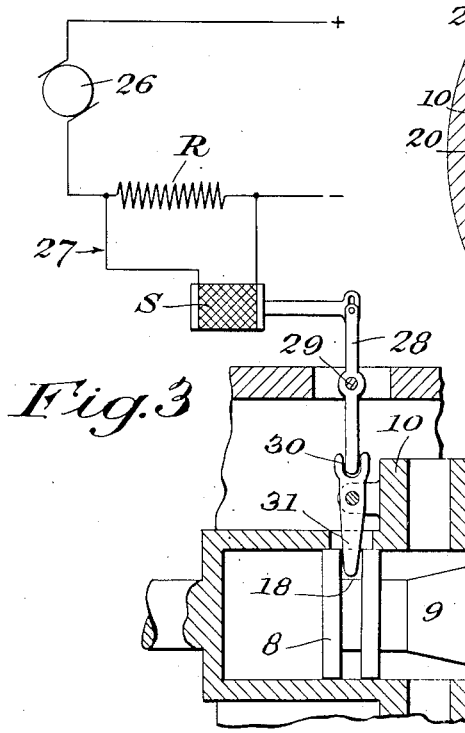
Fig. 3 is a partly diagrammatic view of a modified form of control for my invention.

I have indicated in Fig. 3 an embodiment of my invention in which my device is employed to vary the speed of a generator 26, the circuit 27 for which includes in parallel the resistance R and the solenoid S in control of the lever 28 pivoted as at 29 to the casing 1 and engageable with the recessed ring 30 including supporting portions 31 extending into the groove 18. It will be appreciated that as the load on the line varies, the flow of the current may be accordingly decreased or increased as desired.

What I therefore claim and desire to secure by Letters Patent is:

1. A coupling device comprising a drive member, a driven member, one of said members having an axial chamber and radial bores in communication therewith, said other member having an annular portion having pockets overlying said bores, a slidable member in said axial chamber, said slidable member including a conical portion underlying said bores, compressible coupling means in said bores intermediate said conical portion and said annular portion, and means extending into said axial chamber to slide said slidable member to vary the effectiveness of said coupling means.

2. The device of claim 1 in which the member having the axial chamber has an aperture in communication therewith and the means to slide said slidable member comprises a lever pivotally carried by said member and extending through said aperture into engagement with said slidable member.

3. The device of claim 1 in which the member having the axial chamber has an aperture in communication therewith and the means to slide said slidable member comprises a governor including a lever pivotally carried by said member and extending through said aperture into engagement with said slidable member.

JESSE W. HALE.